United States Patent [19]

Beachy

[11] Patent Number: 4,489,268

[45] Date of Patent: Dec. 18, 1984

[54] RECHARGEABLE BATTERY WITH SEPARATE CHARGING TERMINAL CONTACT RING

[75] Inventor: Robert W. Beachy, Gainesville, Fla.

[73] Assignee: General Electric Company, Gainesville, Fla.

[21] Appl. No.: 455,768

[22] Filed: Jan. 5, 1983

[51] Int. Cl.³ .............................................. H02J 7/00
[52] U.S. Cl. ....................................................... 320/2
[58] Field of Search ............................................ 320/2

[56] References Cited

U.S. PATENT DOCUMENTS 3,506,902  4/1970  Sullivan ................................... 320/2
4,147,838  4/1979  Leffingwell .............................. 320/2

FOREIGN PATENT DOCUMENTS 8204355  12/1982  United Kingdom .
2075247  5/1983  United Kingdom .

Primary Examiner—William M. Shoop
Assistant Examiner—Anita M. Ault
Attorney, Agent, or Firm—Henry J. Policinski

[57] ABSTRACT

A generally cylindrical rechargeable battery is provided leaving a pair of power terminals for delivering energy to an energy-using device. The battery further includes a charging terminal contact spaced apart from the power terminals and extending substantially around the circumference of the battery whereby charging contact on the battery may engage a corresponding charging contact in the energy-using device to charge the battery in all rotational positions of the battery.

6 Claims, 4 Drawing Figures

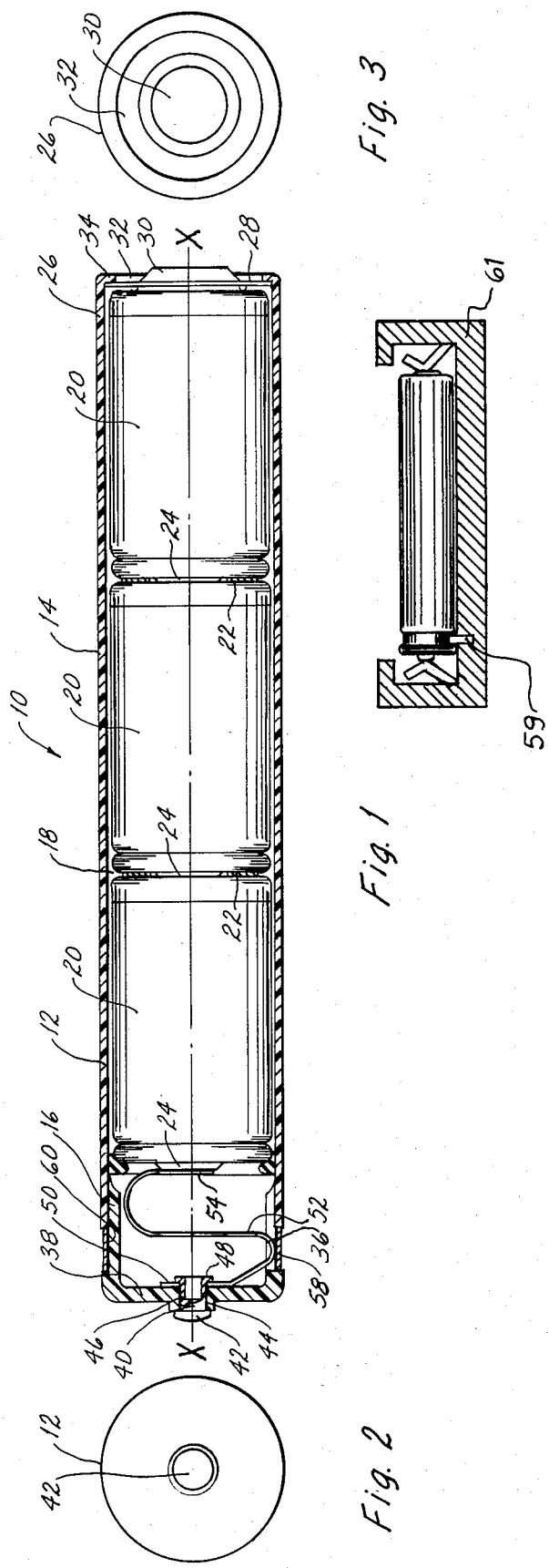

RECHARGEABLE BATTERY WITH SEPARATE CHARGING TERMINAL CONTACT RING

The present invention relates to the field of rechargeable batteries and more particularly to batteries capable of being recharged in the energy-using device in which they reside.

BACKGROUND OF THE INVENTION

May of todays battery-operated consumer products drain energy from the batteries at high rates. These high drain rates make the device particularly suitable for rechargeable batteries and, for user convenience, many products sold today contain internal circuiting for charging the rechargeable batteries while they are installed in the energy using device.

Because rechargeable batteries, such as nickel cadmium batteries, are sold in the same AA, C and D sizes as are primary (non-rechargeable) batteries, either primary or rechargeable batteries may be inserted into the energy using device. However, since most primary batteries may not be safely recharged, extreme care must be taken to insure that the charging circuit will provide recharging current only when a rechargeable battery is inserted in the energy-using device and will not provide recharging current when a primary battery is inserted in the energy-using device.

U.S. Pat. No. 4,147,838 issued to Edward A. Leffingwell discloses a concept for recharging only a rechargeable battery in an energy-using device which will accept either a rechargeable battery or a primary battery. This patent teaches a separate charging terminal contact on the rechargeable battery which engages a corresponding charging terminal in the energy-using device. The charging terminal contact is spaced from the power terminal contacts on the battery and engages the corresponding charging terminal of the energy-using device in a location remote from the power terminal contacts. Since a primary battery does not have a charging terminal contact in the same location, the structure disclosed in the above-referenced patent insures that a primary battery will not be recharged when inserted in the energy-using device. The present invention is an improvement upon the structure disclosed in the above-referenced patent.

Typical AA, C and D size batteries are generally cylindrical in shape; that is to say, they extend circumferentially about and axially along a central axis and have one power terminal contact at one end of the cylinder and another power terminal contact at the other end of the cylinder. Because of this cylindrical shape the battery may be inserted in the energy-using device in a number of different rotational positions. More specifically, while the battery must be inserted so as to be axially aligned with the axially extending cavity in which the battery resides in the energy-using device, the battery may be rotated about its axis and installed in the cavity in the energy-using device in one of any number of rotational positions. Accordingly, use of a terminal contact of the type taught in the aforementioned patent on the circumferentially extending outer surface of the battery makes it possible that engagement between the charging terminal contact on the battery and the corresponding charging contact in the energy-using device may not be effected. The present invention addresses this problem and provides a solution which insures that engagement is always effected.

SUMMARY OF THE INVENTION

Accordingly, it is an object of the present invention to provide a rechargeable battery suitable for charging while installed in an energy-using device.

It is another object of the present invention to provide means for recharging only a rechargeable battery and for precluding recharging of a primary battery.

It is yet another object of the present invention to provide means for recharging a rechargeable battery in all rotational positions in which the battery may be installed in an energy-using device.

Briefly stated, these and other objects, which will become apparent from the following specifications and appended drawings, are accomplished by the present invention which, in one form, comprises a rechargeable battery having a housing at least partially defined by a periphery and containing at least one cell. The battery has first and second power terminal contacts associated therewith and a charging terminal contact spaced from the power terminal contacts of the battery. The charging terminal contact is electrically connected to one of the cells and extends substantially about the periphery of the battery so as to provide contact between the charging terminal contact on the battery and a corresponding charging terminal contact in the energy-using device for all rotational positions of the battery.

BRIEF DESCRIPTION OF THE DRAWINGS

FIG. 1 is a cross-sectional view of the rechargeable battery comprising the present invention.

FIG. 2 is an end view of the rechargeable battery comprising the present invention.

FIG. 3 is a view of the end of the rechargeable battery opposite to the end depicted in FIG. 2.

FIG. 4 is a view of the side of the rechargeable battery positioned in the energy using device.

DETAILED DESCRIPTION OF THE PREFERRED EMBODIMENT

While this invention is susceptible of embodiment in many different forms, there is shown in the drawings and described herein in detail a preferred embodiment of the invention, and modifications thereto, with the understanding that the present disclosure is to be considered exemplary of the principles of the invention and not as limiting the invention to the embodiments illustrated and described.

Referring now to FIG. 1, there is depicted in cross-section generally at 10 a rechargeable battery comprising the present invention. Battery 10 is generally cylindrical in shape, extending both circumferentially about and axially along longitudinal axis X—X. Battery 10 is comprised of a hollow cylindrical housing 12 formed by a hollow cylindrical base portion 14 and a hollow cylindrical cap portion 16 joined to base portion 14 by conventional means such as by threaded engagement, interference fit or adhesive attachment. Joined thusly together, base portion 14 and cap portion 16 cooperate to form a cavity 18 extending along the entire axial length of housing 12. Within the cavity 18 of housing 12, a plurality of generally cylindrical rechargeable cells 20 reside in series relationship; that is to say the negative terminal 22 of one of the cells 20 is electrically connected to the positive terminal 24 of the next adjacent cell 20. The cell 20 at one end 26 of housing 12, is electrically connected to a first power terminal contact 28 of battery 10. Power terminal contact 28 is generally comprised of a disc-like configuration and has a central protuberance 30 which protrudes through an aperture 32 disposed in end 26 of battery housing 12. Power terminal 28 is retained entrapped within cavity 18 of housing 12 by reduced-diameter ring portion 34 which is disposed at end 26 of battery housing 12 and which has an inner diameter less than the outer diameter of power terminal contact 28. Protuberance 30 of power terminal contact 28 is adapted to engage a corresponding power terminal contact (not shown) contained in the energy-using device.

Also residing within cavity 18 of battery housing 12 is conductive strap member 36 disposed at end 38 of housing 12. Strap member 36 is comprised of a conductive material and electrically connects a cell 20 disposed proximate end 38 with a second power contact terminal 40 of battery 10. Power terminal contact 40 is generally comprised of a rivet-like configuration having one end 42 protruding from aperture 44 disposed in end wall 38 of housing 12. Power terminal contact 40 further is comprised of a shank portion 46, extending through aperture 44 and disposed intermediate protruding end portion 42, and expanded end portion 48. Expanded end portion 48 is disposed in recess 18 and is flared in a conventional manner so as to retain strap member 36 firmly in engagement and affixed to cylindrical cap portion 16 of battery housing 12.

Strap member 36 is comprised of a first leg portion 50 and a second leg portion 54 electrically connected to portion 50 by intermediate portion 52. Leg portion 50 is entrapped between expanded end portion 48 of power contact 40 and end wall 38 of housing 12 and is electrically connected to power contact 40. Leg portion 54 is disposed in abutting contact with the positive terminal of cell 20 to provide electrical connection between cells 20 and power terminal contact 40.

In order to provide for charging of rechargeable battery 10, a separate charging terminal contact 58 is disposed spaced apart from each power contact terminal 28 and 40. Charging terminal contact 58 is generally comprised of a ring or annular construction with its axis generally coincident with axis X—X. Charging terminal contact 58 resides in circumferencially and axially extending recess 60 provided in the external surface of battery housing 12 between power terminal contacts 28 and 40. Recess 60 extends circumferentially 360 degrees about and exterior to housing 12. Axially extending window 62 in end cap portion 16 of housing 12 provides an opening adjacent to charging terminal contact 58 through which intermediate portion 52 of strap member 36 may project and thereby engage and be electrically connected to charging terminal contact 58 in any conventional manner such as by welding. Since contact 58 extends substantially about the circumferential periphery of battery 10, means are provided which establish a charging terminal contact which engages a corresponding charging terminal 59 in the energy-using device 61 for all rotational positions of battery 10 about axis X—X.

It is readily observed from the foregoing description that power terminal contacts 28 and 40 form the power circuit terminals for delivering battery energy to the energy-using device and that charging terminal contact 58 and power terminal contact 28 form the charging circuit terminals for charging the battery. Since, in the battery of the present invention, the charging terminal contact 58 is spaced from the power terminal contacts 28 and 40, and since the corresponding charging terminal in the energy-using device are similarly spaced from power terminal contacts 28 and 40, the charging of a primary battery having power terminal contacts in the same location as power terminal contacts 28 and 40, will be precluded.

While the preferred embodiment of the present invention has been depicted and described, it should be appreciated that modifications and alterations may be made in the embodiment without departing from the scope of the invention. By way of example and without limitation, the charging ring of the present invention may comprise the charging terminal in the energy-using device.

I claim:

1. A rechargeable battery having a generally cylindrical circumferentially and axially entending housing for confining a plurality of rechargeable cells connected in series, said battery having first and second power terminal contacts associated therewith adapted to engage corresponding terminals of an energy using device wherein the improvement comprises:

a charging terminal contact spaced from said power terminal contacts, said charging terminal contact electrically connected to one of said cells and extending circumferentially about the exterior of said housing.

2. The invention as set forth in claim 1 wherein said charging terminal contact extends substantially 360° about the circumference of said housing.

3. The invention as set forth in claim 2 wherein said charging terminal contact and one of said power terminal contacts comprise the charging circuit terminals for said battery.

4. The invention as set forth in claim 3 wherein said charging terminal contact is in electrical contact with the other of said power terminal contacts.

5. In an electrical circuit including a rechargeable battery having a generally cylindrical circumferentially and axially extending battery housing for confining at least one rechargeable cell, said battery housing having first and second power terminal contacts associated therewith and adapted to removeably engage corresponding terminals of an energy-using device, said battery insertable in said energy-using device in a plurality of rotational positions about the axis of said cylindrical housing, the improvement comprising:

a charging terminal contact associated with said battery and spaced from said power terminal contacts and electrically connected to said at least one of said cells; and a charging terminal contact associated with said energy using device and adapted to electrically engage said charging terminal contact associated with said battery, at least one of said charging terminal contacts extending circumferentially about said battery to provide said electrical engagement for all of said rotational positions of said battery.

6. A rechargeable battery comprising:

a hollow generally cylindrical circumferentially and axially extending battery housing having a cavity extending from a first end of said cylindrical housing to a second end of said cylindrical housing, said housing having a window providing an opening from said cavity to the exterior of said housing;

a plurality of rechargeable cells disposed in said cavity and connected electrically in series relationship;

a first power terminal contact member disposed at said first end of said cylindrical housing and electrically connected to a first one of said cells in said series, said first member having a protuberance protruding from said first end of said housing;

a second power terminal contact member disposed at said second end of said housing, said second member having a first portion protruding from said second end of said housing and an expanded end portion disposed in said cavity;

a strap member disposed at said second end of said cavity, said strap member including a first leg portion entrapped between said housing and said expanded end portion of said second power terminal contact, said strap member including a second leg portion disposed in abutting contact with a last one of said cells in said series, said strap member further including an intermediate portion electrically connecting said first leg portion with said second leg portion;

an annular charging contact terminal extending substantially 360 degrees about and exterior to said housing proximate said window, said intermediate portion of said strap member projecting through said window to thereby engage said annular charging contact terminal and establish electrical connection therewith whereby said charging terminal and said first power terminal form the charging circuit terminals for said battery.

* * * * *